United States Patent [19]

Milton et al.

[11] Patent Number: 4,655,928
[45] Date of Patent: Apr. 7, 1987

[54] MEMBRANE PROCESSES FOR METAL RECOVERY AND POLLUTION CONTROL IN METAL PROCESS INDUSTRIES

[75] Inventors: Everett C. Milton, White Bear Lake, Minn.; Harry P. Gregor, New York, N.Y.

[73] Assignee: GNB Incorporated, Mendota Heights, Minn.

[21] Appl. No.: 543,191

[22] Filed: Oct. 18, 1983

[51] Int. Cl.$^4$ .................................... B01D 13/00
[52] U.S. Cl. .................... 210/651; 210/652; 210/195.2; 210/259
[58] Field of Search .............. 210/259, 251, 638, 651, 210/652, 34.1, 195.1, 195.2

[56] References Cited

U.S. PATENT DOCUMENTS

| | | | |
|---|---|---|---|
| 515,763 | 3/1894 | Von Grabowski | 204/180 P |
| 2,198,045 | 2/1936 | Suchy et al. | 204/9 |
| 2,631,974 | 1/1950 | Conwell | 204/180 P |
| 3,340,186 | 5/1964 | Weyl | 210/22 |
| 3,567,631 | 7/1969 | Lukach et al. | 210/23 |
| 3,689,253 | 8/1970 | Dorenfeld et al. | 136/26 |
| 3,749,657 | 9/1970 | LeBras et al. | 204/180 P |
| 3,752,749 | 8/1973 | Chlanda et al. | 204/180 P |
| 3,787,304 | 1/1974 | Chlanda et al. | 204/180 P |
| 3,948,680 | 4/1976 | Mao et al. | 136/26 |
| 3,988,165 | 10/1976 | Mao et al. | 29/623.2 |
| 4,024,055 | 12/1976 | Blann | 210/45 |
| 4,025,430 | 1/1976 | Pagel | 204/180 P |
| 4,036,749 | 7/1977 | Anderson | 210/259 X |
| 4,046,686 | 9/1977 | Goldstein | 210/638 |
| 4,082,835 | 4/1978 | Chlanda et al. | 204/180 P |
| 4,105,556 | 8/1978 | D'Amaddio et al. | 210/259 X |
| 4,107,015 | 8/1978 | Chlanda et al. | 204/180 P X |
| 4,107,264 | 8/1978 | Nagasubramanian et al. | 423/81 |
| 4,116,889 | 8/1978 | Chlanda et al. | 521/27 |
| 4,118,219 | 10/1978 | Elmore et al. | 75/103 |
| 4,141,825 | 10/1979 | Cogner | 210/23 H |
| 4,144,158 | 3/1979 | Nagasubramanian et al. | 204/180 P |
| 4,168,297 | 9/1979 | Nagasubramanian et al. | 423/70 |
| 4,176,057 | 11/1979 | Wheatley et al. | 210/638 X |
| 4,188,291 | 4/1979 | Anderson | 210/23 H |
| 4,219,396 | 8/1980 | Gancy et al. | 204/180 P |
| 4,238,305 | 12/1980 | Gancy et al. | 204/180 P |
| 4,253,900 | 3/1981 | Dege et al. | 156/309.3 |
| 4,311,771 | 1/1982 | Walther | 429/51 |
| 4,338,200 | 7/1982 | Zeijlstra | 210/724 |
| 4,391,680 | 12/1983 | Chlanda et al. | 204/180 P |
| 4,392,959 | 7/1983 | Coillet | 210/651 X |

OTHER PUBLICATIONS

Chang, "Bipolar Membrane Water-Splitting", a thesis submitted 1979 at Columbia University.

*Primary Examiner*—Frank Spear
*Attorney, Agent, or Firm*—Augustus J. Hipp; Herbert C. Rose

[57] ABSTRACT

A process for the treatment of an aqueous stream containing an acid or base and typically a precipitatable material such as a metal ion comprises:
(a) subjecting the aqueous stream to (i) a treatment to produce a relatively pure stream of water and a concentrated aqueous stream, and (ii) water splitting to produce a stream of base, a stream of acid and a dilute aqueous stream of a concentration lower than the concentrated aqueous stream, the treatments (i) and (ii) being effected in either order,
(b) recycling at least part of the pure water stream produced in (a)(i) to an earlier stream either in the production leading to said aqueous stream or to step (i) or (ii),
(c) recycling at least part of the acid and/or base streams produced in (a)(ii) to an earlier stream either in the production leading to said aqueous stream or to an earlier step in the process, and
(d) recycling at least part of the lower concentration stream produced in (a)(ii) to either (a)(i) or to another step in the process, whereby, when present, only the precipitatable material is removed from the aqueous stream, thereby obviating toxic waste disposal problems.

19 Claims, 8 Drawing Figures

MEMBRANE PROCESSES FOR METAL RECOVERY AND POLLUTION CONTROL IN METAL PROCESS INDUSTRIES

BACKGROUND OF THE INVENTION

The present invention relates to a novel process for the treatment of aqueous streams such as waste streams and metal ion-containing or other precipitatable material aqueous streams with a minimum of treatment water by utilizing reverse osmosis and electrodialytic water splitting, in sequence.

At the present time, given the ever-increasing cost of energy and the increased demands for the control of environmental pollution on the one hand, and the need to conserve important metal resources on the other, there arises a serious need for new and cost-effective processes to treat industrial process streams some of which are dilute in metals. Sometimes this is done for the purpose of recovering metal values; other times it is for the purpose of avoiding environmental pollution.

Typical metals which are sources of environmental pollution and which are valuable as minerals are copper, lead and cadmium, which are found in a wide range of waste waters resulting from plating and finishing processes such as metal finishing, from various rinses from pickling operations, from acid mine drainage and also from the extraction of metals as from depleted ore tailings by dump leaching. In certain processes, the rinse solutions are so dilute that a simple process of neutralization, precipitation and collection of an insoluble precipitate suffices. However, in the case of cadmium and lead as examples, the allowable toxic metal levels in effluents are so low that removal by precipitation often does not suffice. In the case of the copper recovery from the acid leach dumps, the residual concentration of acid is so high as to require a substantial amount of base for its neutralization.

In many industrial processes which formerly were able to employ lime for the precipitation of heavy metals and for the neutralization of acid such as sulfuric acid, with the formation of insoluble calcium sulfate, these are no longer environmentally acceptable because even the low level of contamination of heavy metals causes the solid waste to be classified as a toxic waste, requiring transportation to special dumps at considerable expense.

Electrodialysis, including especially electrodialytic water-splitting, processes are well known and of considerable value in industry. In electrodialysis, electrolytes are removed by the electric current from a feed compartment and selectively transported across ion-permeable membranes into a concentrate stream, with the feed stream being thus converted into a deionate stream. In water splitting, a feed stream contains anions and cations, wherein the anions of the feed stream plus hydrogen ions from the water pass by the current from a bipolar membrane into an acid compartment, while cations from the feed stream plus hydroxide ions from the water pass from the bipolar membrane into a base compartment.

The electrodialysis process is highly developed and is described in several texts including the chapter by Shaffer and Mintz in "Principles of Desalination, Part A" edited by Spigler and Laird, Academic Press, New York 1980. Bipolar membranes and the process of water splitting are also well known. Bipolar membranes have been articles of commerce for several years, with those described by Dege, Chlanda et al., U.S. Pat. Nos. 4,116,889 and 4,253,900 as recent examples. Water-splitting processes are also described in several recent patents including U.S. Pat. Nos. 3,787,304, 4,219,396, 4,238,305 and 4,017,015.

Likewise, the technique of reverse osmosis (hereinafter "RO") is well known and has been utilized for various applications. For example, RO has been employed in the automobile industry to treat the rinse water emanating from various painting operations.

Yet, these technologies have not been heretofore utilized cojointly in a fashion to deal with the several and diverse problems associated with the problem streams described herein.

It is accordingly an object of the invention to provide a process which will handle all these manifold problem streams, one which does not require elaborate chemical processing and one which can be operated on the very large scale of acid leach operations on the one hand as for copper recovery and also on a small scale for battery manufacture, smelters, electroplating, metal finishing and pickling operations on the other.

Another general object of this invention provides a process which can eliminate the disposal problems associated with toxic wastes. A related and more specific object is to provide a process in which the toxic wastes that would otherwise have to be disposed of are rendered useful so as to be capable of being returned in some fashion to either the manufacturing process involved or as an aid in the treatment of the stream resulting from such manufacturing process.

BRIEF DESCRIPTION OF THE INVENTION

This and other objects are realized in accordance with the present invention pursuant to which there is provided a process, preferably a closed process, for the treatment of an aqueous stream, possibly containing a precipitatable material and an acid and/or base, comprising (a) separating the precipitatable material from the aqueous stream, (b) subjecting the aqueous stream to (i) a treatment, such as reverse osmosis, to produce a relatively pure stream of water and a concentrated aqueous stream, and (ii) water splitting to produce a stream of base, a stream of acid and a deionate or dilute aqueous stream of a concentration lower than the concentrated aqueous stream, the treatments (i) and (ii) being effected in either order, and (c) recycling at least part of the pure water stream produced in (b) (i) to an earlier stream either in the production leading to said aqueous stream or to step (a), (b)(i) or (b)((ii) or to another step in the process, (d) recycling at least part of the acid and/or base streams produced in (b)(ii) to an earlier stream either in the production leading to said aqueous stream or to another step in the process, and (e) recycling at least part of the lower concentration stream produced in (b)(ii) to either (b)(i) or to another step in the process.

In short, the logical order of operation is selected in order to maximize efficiency. More specifically, the particular sequence employed will be dependent upon factors such as the parameters of the aqueous stream to be treated and the conditions desired for the manufacturing process involved. However the operation is carried out, the present invention may be preferably and advantageously employed to wholly obviate the need for disposing of any stream. In short, the present invention can provide total reuseability of the aqueous stream.

DETAILED DESCRIPTION OF THE INVENTION

For illustrative purposes, one can consider a waste wash stream from the production of lead storage batteries, the stream comprising a dilute stream of sulfuric acid containing small amounts of heavy metals such as lead. Mere neutralization of the sulfuric acid with lime to produce insoluble calcium sulfate will not suffice since the precipitate is contaminated with lead so that it cannot simply be dumped. Either the lead must be removed or the precipitate must be disposed of in an expensive fashion.

The present invention in effect separates and concentrates the lead to an extent that it may be treated in a smelter rather than being discarded while effectively recycling the sulfuric acid waste after purification and concentration.

The invention is applicable to removal of other transition and/or heavy metals as well, e.g. nickel, cadmium, chromium, zinc, and the like as well as to streams not having metal ions or other precipitatable materials.

Where the aqueous stream includes a precipitatable material, the first step in the process involves separation, typically separation of such material in solid form as, for example, by adding magnesium hydroxide to a dilute sulfuric acid waste stream to form a dilute solution of magnesium sulfate, plus solid lead sulfate. This may be suitably followed by filtration in conventional presses or other filtration to remove the lead sulfate which can be treated, if desired, in a lead smelter to recover its lead content.

In one embodiment, the residual stream of magnesium sulfate solution is subjected to RO, yielding a substantially pure stream of water and a more concentrated solution of magnesium sulfate. The pure water may then be recycled to the battery manufacturing process, e.g. the initial washing operation or to any other step where needed. It is most economical to recycle all the water; although if desired, the pure water could be disposed of in whole or in part, so that none or only part of the water is used for a recycle.

The concentrated magnesium sulfate solution is then subjected to electrodialytic splitting in a water splitting cell producing a partly demineralized feed for recycle, sulfuric acid and magnesium hydroxide, all of which are recycled. Again, as was the case with the pure water, it will be most economical to utilize the entire outputs from the water splitting for recycle, although there is no necessity to do so. Similarly, while the stream being treated is described as being aqueous, it will be appreciated by those skilled in the art that the stream can be any liquid which is capable of being treated in a water-splitting cell with the efficiency needed for the particular operation. Typically, this will mean that the stream will comprise principally water, with the quantity of other organic liquids that may be present being dictated by relative operability and efficiency considerations.

Thus, in effect, the only material that need be withdrawn from the system is the heavy metal impurity, minimizing any waste disposal problems and need for large water supplies, except for small make-up quantities.

In a variant, the sequence is changed but the various steps are substantially the same.

The invention will be further described with reference to the accompanying drawings wherein.

Figure 1:
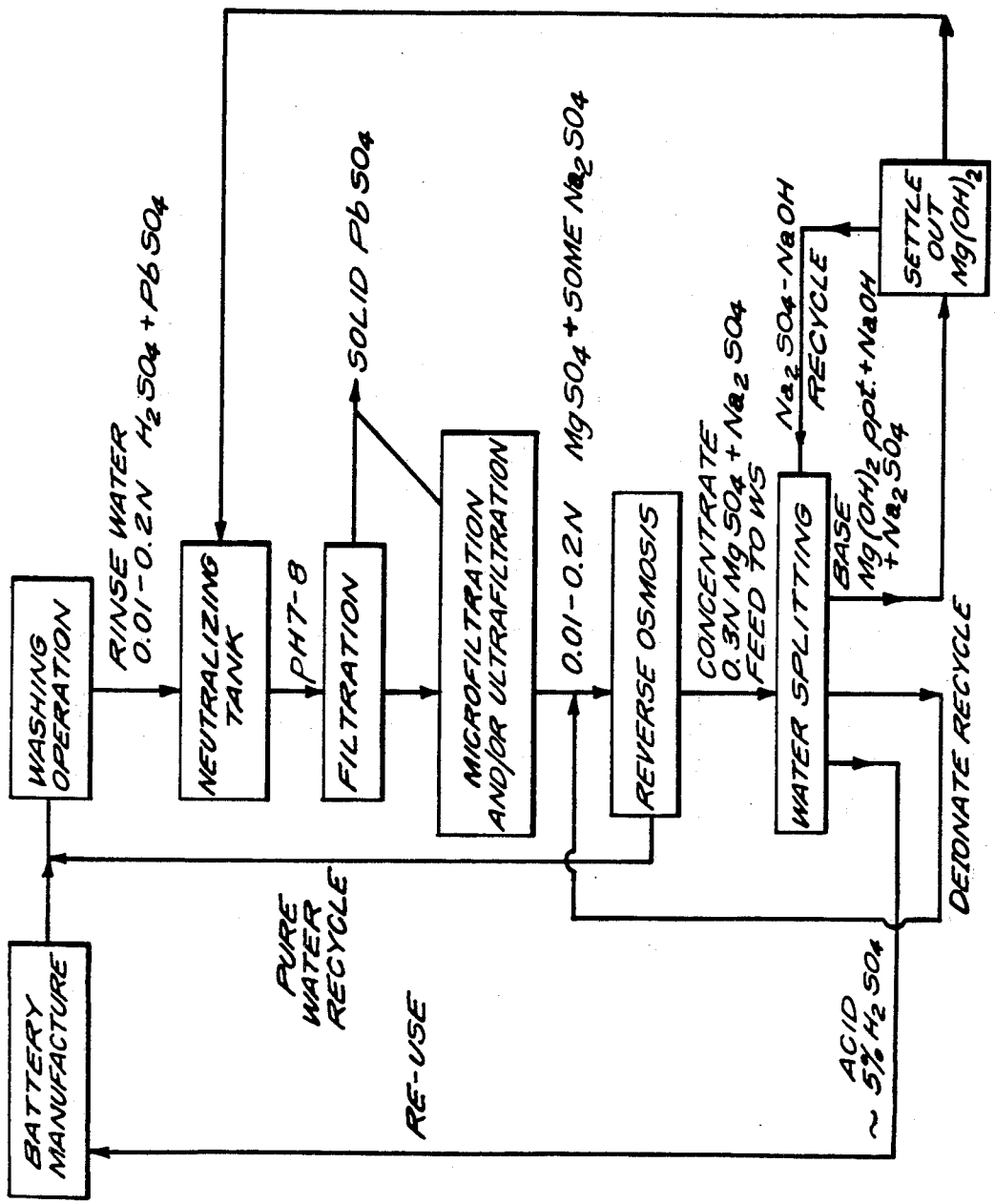
FIGS. 1 and 1A are schematic flow sheets of processes in accordance with the invention for treating a dilute sulfuric acid lead-containing solution, such as is obtained in a conventional washing operation in the production of lead-acid storage batteries.

Referring now more particularly to the drawings, in FIG. 1 the starting stream at the top is the rinse wash water obtained in the lead-acid storage battery manufacture, comprising a dilute sulfuric acid solution containing some dissolved lead as lead sulfate, and perhaps particulate material such as lead in elemental form or as lead sulfate or the like. The dissolved lead may be removed by adjusting the pH of the stream, as by neutralizing to a pH of preferably about 8 with a relatively concentrated slurry of a base such as, for example, magnesium hydroxide containing some sodium hydroxide and some sodium sulfate, recycled from a later stage in the process. This forms a coarse precipitate of lead sulfate which may be readily removed from the aqueous stream, as by filtration with conventional filters and/or presses. Any finely divided, suspended solids which remain may be removed by, for example, microfiltration and/or ultrafiltration.

The neutralized aqueous solution containing magnesium sulfate and sodium sulfate is then subjected to RO which yields a quantity of relatively pure water that may be advantageously recycled to the washing step in the battery manufacturing operation or to any other step in the manufacturing or treating process, as may be needed. Any conventional membrane may be used for the RO, a conventional cellulose acetate membrane having been found useful.

RO also yields a more concentrated solution of magnesium sulfate and sodium sulfate, which is then advanced to a water-splitting cell. This produces a $H_2SO_4$ stream, typically 3–5%, which is desirably recycled for use in the battery manufacturing process where needed; and a base stream which is permitted to settle, the liquid being recycled to the water-splitting cell and the slurry being recycled to the neutralization step.

The water-splitting cell also produces a third stream containing some salts, designated as a deionate stream, which is less concentrated than the stream entering the water-splitting cell. This stream may be desirably recycled to either the water-splitting cell or to the RO step.

In the preferred embodiment, sodium sulfate or other soluble salt is added to the water-splitting cell to prevent insoluble compounds such as magnesium and calcium hydroxide forming therein from fouling the membrane in the water-splitting cell. The nature of the salt which must be added to the acid and/or base compartments in which harmful precipitation is to be avoided is determined by solubility considerations. For example, if magnesium sulfate feed is to be converted into magnesium hydroxide and sulfuric acid, the addition of either sodium sulfate or sodium chloride to the base compartment prior to cell operation and the maintenance of such electrolyte in that compartment during the operation of the cell acts to prevent the harmful precipitation of magnesium hydroxide on the surface of the membrane, in this case the surface of the cation-permeable membrane facing the bipolar membrane.

Preferred soluble salts are the chlorides, nitrates, sulfates, or carbonates of alkali metals, especially sodium, potassium, or lithium; obviously, a wide range of salts are allowable provided that they do not interfere in the final process, do not themselves form precipitates with ions emanating from the feed compartment and are sufficiently low in cost as to be useful. The concentration of the added salt employed is usually not important provided that it is high enough to achieve the desired effect, but not so high as to interfere in the final use of the product stream. For example, when magnesium sulfate is converted into magnesium hydroxide, a concentration of added sodium sulfate or sodium chloride of the order of 0.1N to 1N has been found to be effective; lower concentrations are more desirable when the formed precipitate must be washed to free it of excess salt. Alternatively, and while considered less desirable, other known techniques could be employed to prevent the potential fouling of the membrane, such as intermittent treatment by acid or base to dissolve harmful precipitates, use of an elevated temperature to increase solubility of the material in the stream, or cooling the circulating concentrate stream to precipitate material outside of the cell.

In the water-splitting cells employed in the present invention, to maintain the membrane at desired distances from the walls of the cells and/or from each other, spacers are normally utilized. The conventional spacers have been formed of netted plastics (usually polyolefin) available as Vexar from the DuPont Company, and now made by other organizations. When precipitates, particularly adherent precipitates, are formed, these spacer materials are disadvantageous because the precipitate can be caught at the joining of the spacer material with the membrane itself, remain there, and can eventually cause harm to the membrane. The precipitate also builds up in the diamond-like spacer openings and makes for a higher ohmic resistance in the cell. Accordingly, a much more useful material is the open, ribbed material of the type made by Conwed Manufacturing Company of Minneapolis, Minn., having vertical bars which touch the opposing membranes and act as spacers, with each bar attached to others by much thinner cross-members. Adherent particles have a much lower tendency to adhere to the spacer.

In accordance with another aspect of the present invention, spacers of the general Conwed variety are made hydrophilic, either before or after formation. This tends to make the spacer material less prone to absorb and, therefore, become fouled by precipitates.

By this process, the lead is removed from the wash water in a concentrated form which can be sent to a lead smelter; substantially everything else may be recycled with no water pollution or solid waste problems.

Any other metal ions in the starting waste stream, e.g. cadmium, will come down with the lead.

If desired, the neutralization and filtration steps can be carried out in reverse order, i.e. filtration being carried out prior to neutralization.

In one variant, in place of magnesium hydroxide, only sodium hydroxide is employed. It will still yield lead sulfate, but the problem of solid magnesium hydroxide in the water-splitting cell will be reduced but not entirely eliminated because traces of metals and/or salts which cause precipitates are almost impossible to avoid, and other means of controlling them must be employed. These salts and/or others that could form precipitates within the water splitting cell can be removed by treating the feed stream of the water-splitting cell with selective ion exchange to remove the troublesome salt forms. This process does require the additional treatment of the chemicals used to wash and regenerate the ion exchange system.

The magnesium hydroxide option is accordingly preferred, however, since it means the volume of alkali used for neutralization will be less, a more insoluble heavy metal (lead) salt will result, the volume of base needed for neutralization is reduced so storage is simplified, and the rejection of salts by the RO process is improved.

Further advantages are that, when magnesium salts are involved, the water-splitting process produces magnesium hydroxide which, due to its insoluble nature, is quite concentrated and can be stored conveniently. Further, magnesium hydroxide is more effective than soluble bases in the precipitation of lead compounds. An additional benefit is that magnesium sulfate is easier to concentrate by RO than is sodium hydroxide. Magnesium sulfate produces about half the back osmotic pressure per neutralization equivalent as compared to sodium sulfate, which means that a lower RO pressure is required. Further, the RO permeate is more free of dissolved salts than when sodium salts are used. The use of magnesium salts in the water-splitting process is substantially problem-free, especially when certain dissolved electrolytes are present in the water-splitting cell, as described above.

Yet another variant involves utilizing a suitable RO membrane which does not require a substantially neutral starting stream. There is thus no need for carrying out an initial neutralization, and the magnesium hydroxide produced from the water-splitting cell is merely recycled to such cell, rather than, in part, being recycled to the neutralization tank. Suitable membranes of this type are known, one such material being a synthetic polymer known as polybenzimidazale (PBI) $(C_7H_6N_2)n$, made by Celanese Corporation.

In the preferred illustrated embodiment of FIG. 1, the starting stream has a pH of about 0.8 to 2.5, preferably about 1 to 1.5 and a lead content of about 10 to 1000 ppm, preferably about 100 to 500 ppm. Neutralization is carried out to bring the pH of about 7.8 to about 8.2, preferably about 8 which gives good results for precipitating lead as lead sulfate. After filtration, the neutral effluent is then concentrated by RO to about 0.2 to 0.4N $MgSO_4$. Depending upon the membrane employed, it may be necessary to adjust the pH, as in the case of a cellulose acetate membrane where a pH of about 6 is desirable. The acid necessary may be obtained from the acid side of the water-splitting cell. The purpose of this concentration is two-fold, to produce a pure water permeate for recycle or reuse, and sufficiently concentrated feed which lowers the cost of the subsequent water-splitting process as compared to when a dilute feed is used. The RO permeate can be very pure, with less than 100 ppm of dissolved salts as a rule and very low levels of dissolved lead. However, since this effluent returns to the lead-acid plant, the presence of lead offers no problems. The backwash or blowdown from the ultrafiltration or microfiltration devices gives fairly concentrated lead materials which can be returned directly to a smelter.

The RO concentrate is then passed into a three-compartment water-splitting device, employing bipolar membranes such as are sold by Allied Corporation to convert the anions contained therein into approximately 5% sulfuric acid. Acid of this concentration is readily returned to the lead-acid battery manufacturing process. Base produced by the water-splitting device is recycled to the neutralization process.

Figure 1A:
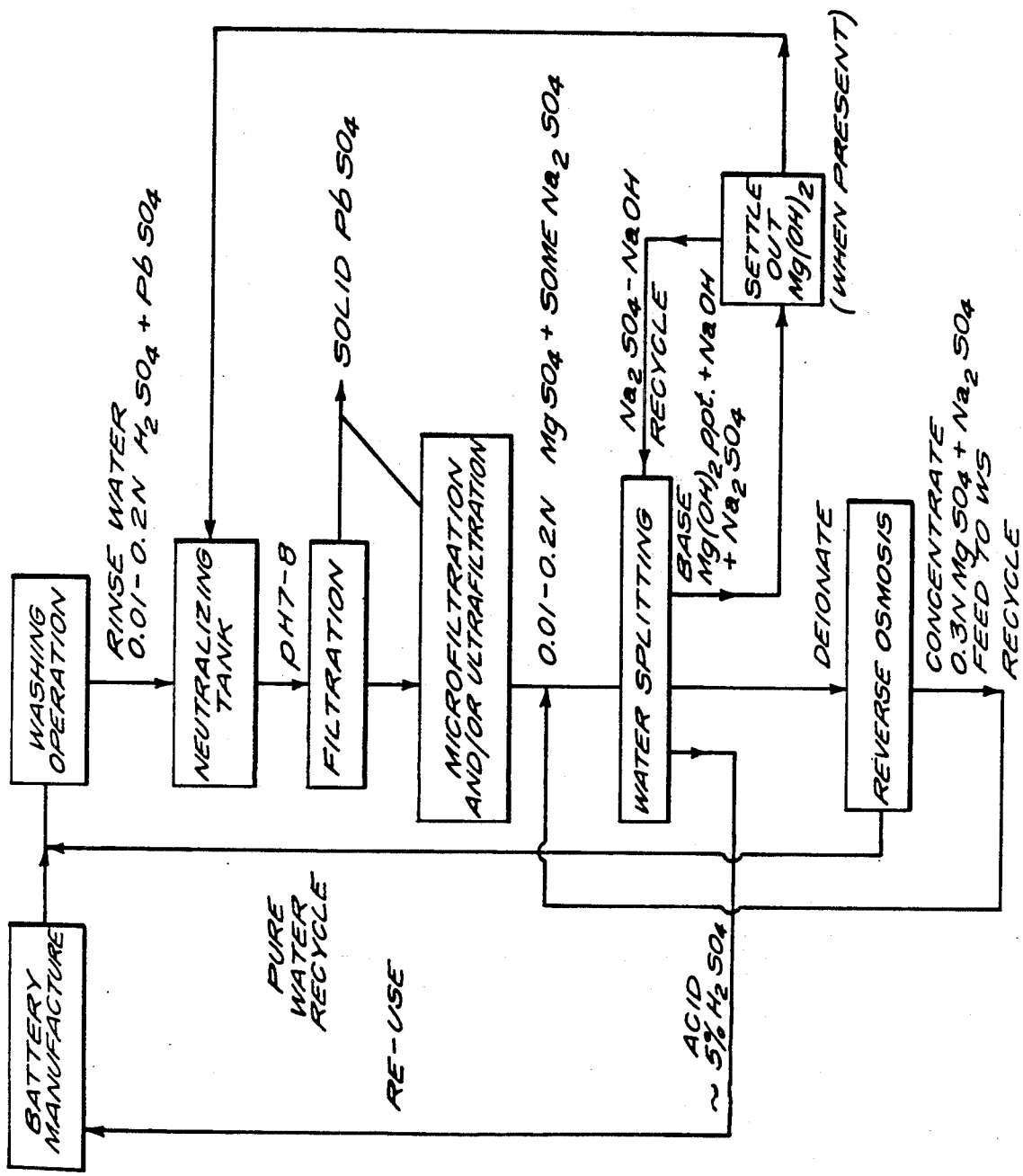

In FIG. 1A, the water-splitting step precedes the RO step, the acid stream from the water splitting again being recycled to battery manufacture and the base stream from the water splitting is again recycled to the neutralization process.

Figure 2:
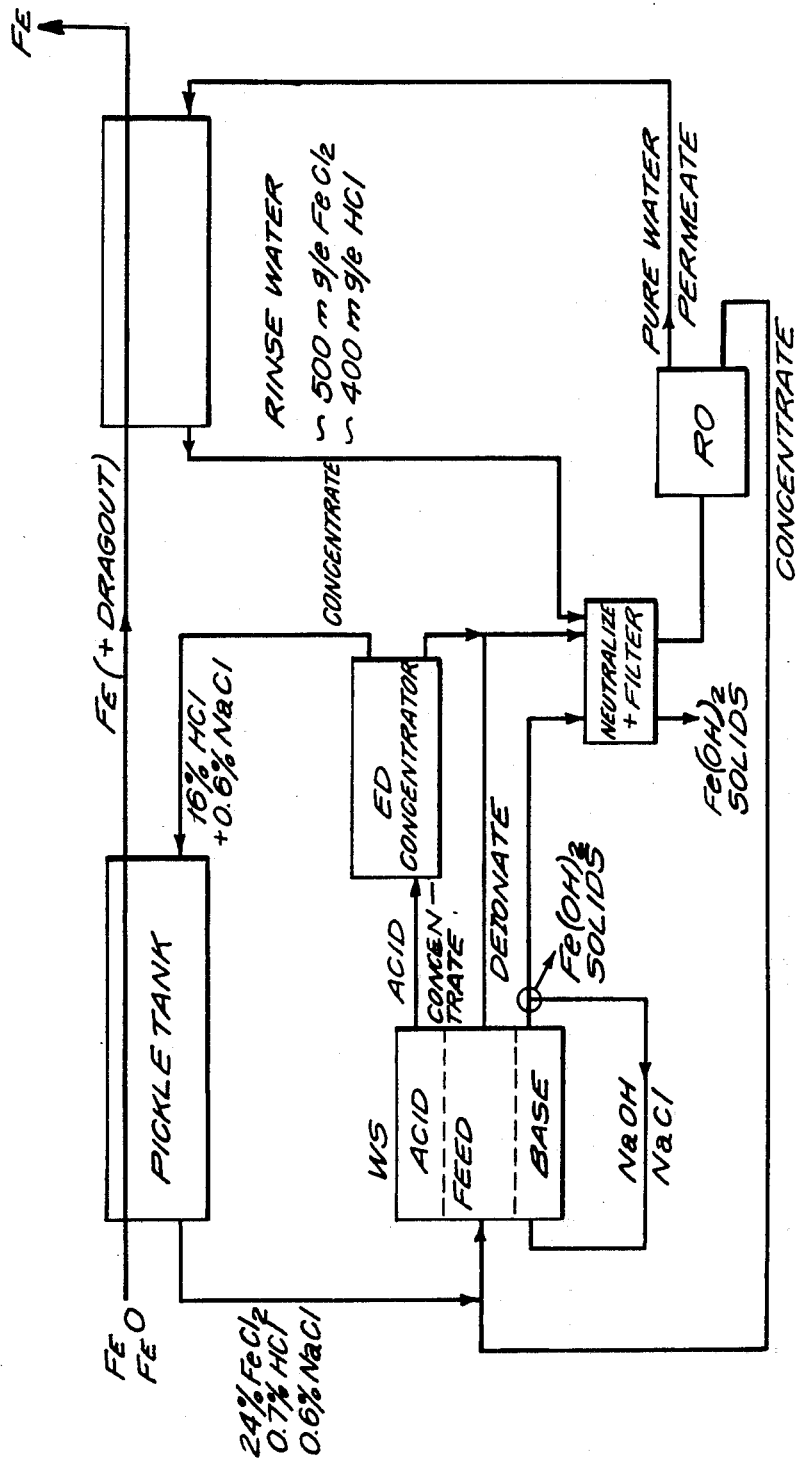
FIG. 2 is a schematic flow sheet of a process for treating waste water from pickling of iron.

In FIG. 2, there is shown an embodiment for the recycle and reuse of spent liquor and wash water from the pickling of iron or other metals. The spent pickle liquor is treated by water splitting to produce a suspension of ferrous hydroxide along with sodium hydroxide and sodium chloride in solution. The acid product stream is concentrated by electrodialysis to reconstitute the pickle acid for reuse. The acid rinse water is neutralized by base generated by the water-splitting cell and then concentrated by RO to produce pure water for reuse as rinse water and a concentrate which is recycled to the water-splitting cell. Suitable parameters are described in FIG. 2.

Figure 3:
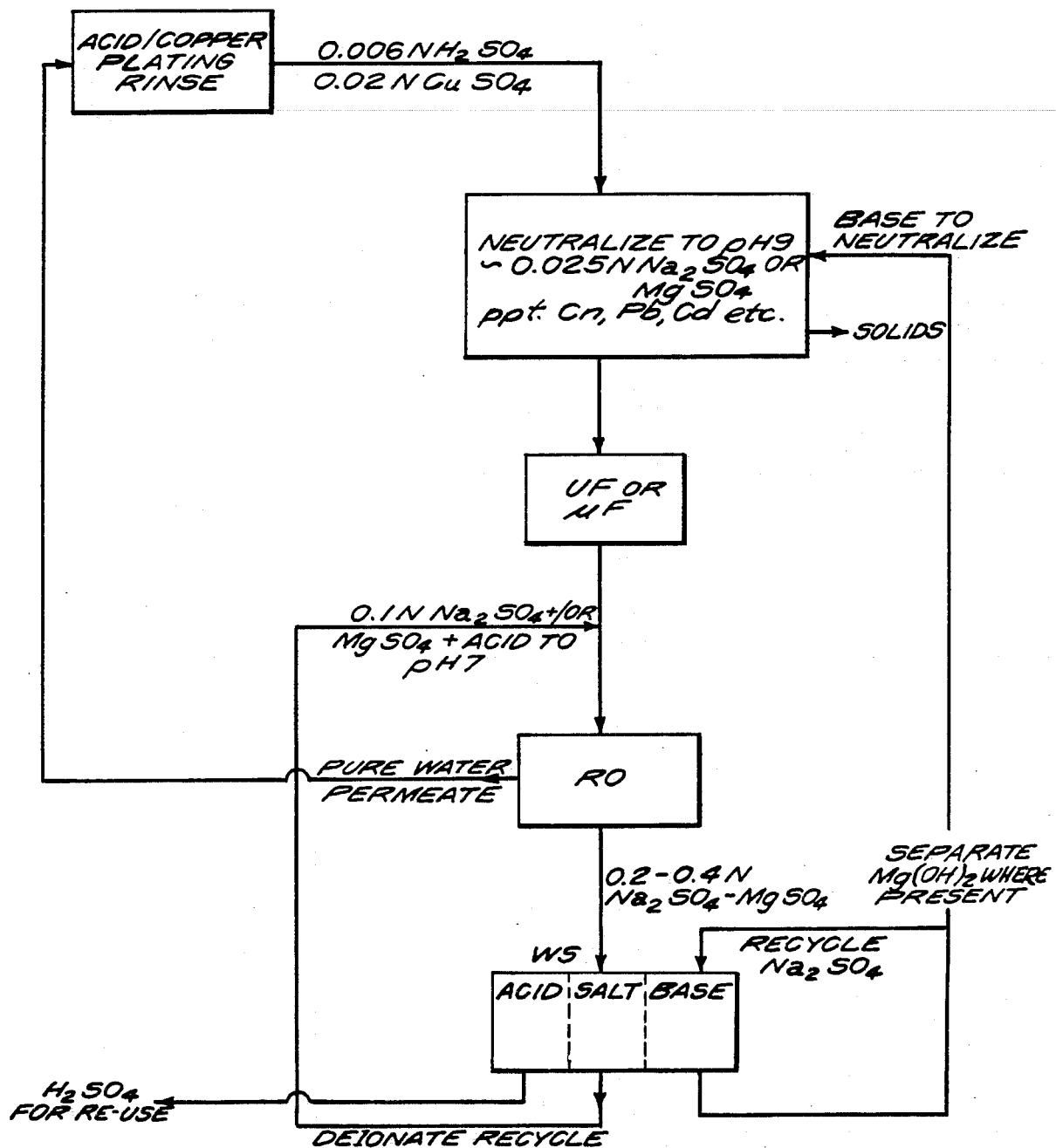
FIGS. 3 and 3A are schematic flow sheets of processes for treating waste water from copper plating.

The treatment of the rinse water of the acid-copper plating bath is shown in FIG. 3 where the rinse water originally is 0.006N in sulfuric acid and 0.02N in copper sulfate. This is then neutralized with either a suspension of magnesium hydroxide containing some sodium hydroxide or a solution of sodium hydroxide, both resulting from the water-splitting cell. After neutralization, the pH is 9; and the solution has been effectively converted into magnesium and/or sodium sulfate. A precipitate of copper with traces of lead, zinc, cadmium and other metals is obtained and the precipitated material is then removed by ultrafiltration or microfiltration in conjunction with ordinary filtration where necessary, to provide an appropriate pretreatment for RO. The pH of this water can then be reduced to approximately the neutral point by acid generated by water splitting. This then provides the feed for RO which raises the concentration in the concentrate to 0.2–0.3N in sodium sulfate or magnesium sulfate. This is the feed to the water-splitting device which produces a base product stream which is either sodium hydroxide or a mixture of magnesium hydroxide and sodium hydroxide, with at least 0.1N sodium sulfate present. The acid product stream is approximately 1N sulfuric acid which is returned to the copper-plating operation. The RO device produces pure rinse water for recycle, and the deionate from water splitting is returned to the feed to the RO process for recycle.

Figure 3A:
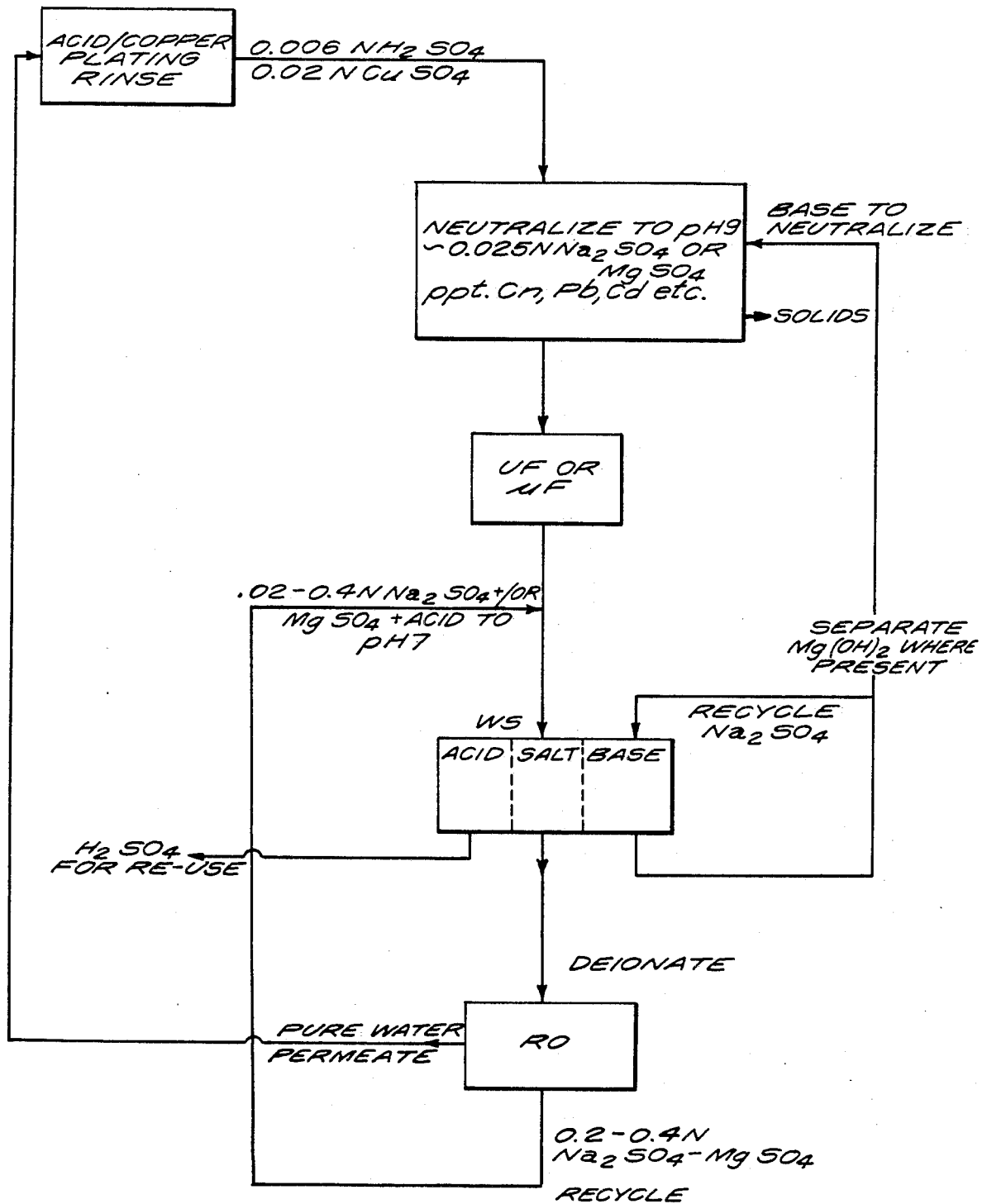

In FIG. 3A, there is shown a variant of FIG. 3, the water splitting in FIG. 3A preceding the RO, but the steps being essentially the same.

Figure 4:
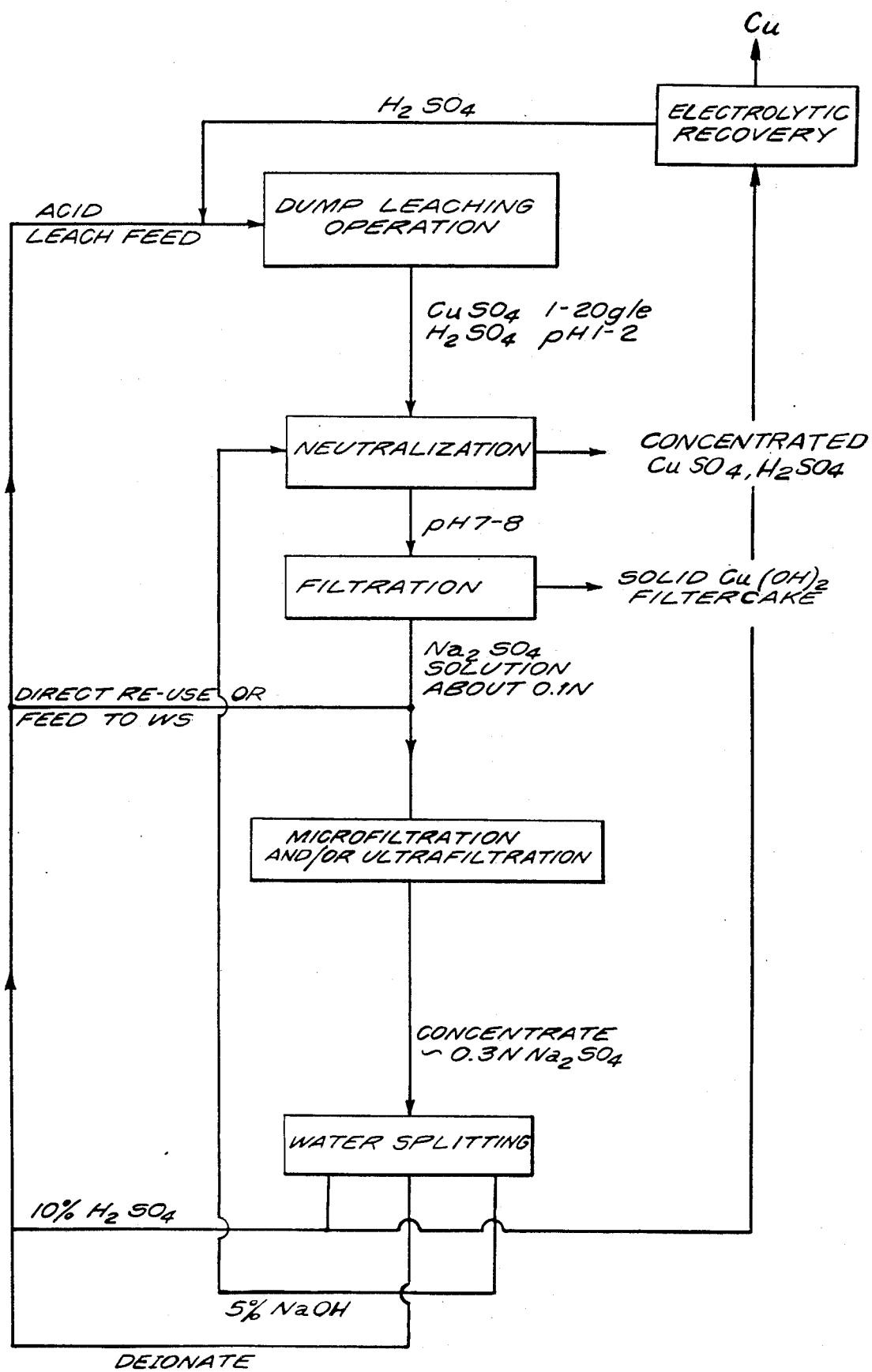
FIG. 4 is a schematic flow sheet of a process for treating waste water from the extraction of copper.

FIG. 4 shows a process for the treatment of acid leach liquors resulting from the dump-leach extraction of copper or a similar metal, wherein the leach liquor contains usually 5 grams per liter of copper or more and where the pH of the leach liquor is approximately 1–2. To reduce water consumption, substantially all water is recycled. The process is similar to that of FIG. 1, with the leach liquor being neutralized by base, the metals separating out in solid form and being removed by a filter press or similar device. The neutralized stream can either be recycled for further extraction upon the addition of acid from water splitting or, if it has a high salt content, purified by RO, producing a concentrate which is the feed to the water splitting and pure water which returns to the process. Since water treatment costs are an important part of overall costs for this process, an optimal combination of water recycle and water treatment is employed. The process is in other respects as in FIG. 1 where the water-splitting cell provides base for neutralization and acid for continuing extraction. The concentrated acid can be used to dissolve the solid copper hydroxide precipitate, and then metal is recovered electrolytically.

Figure 5:
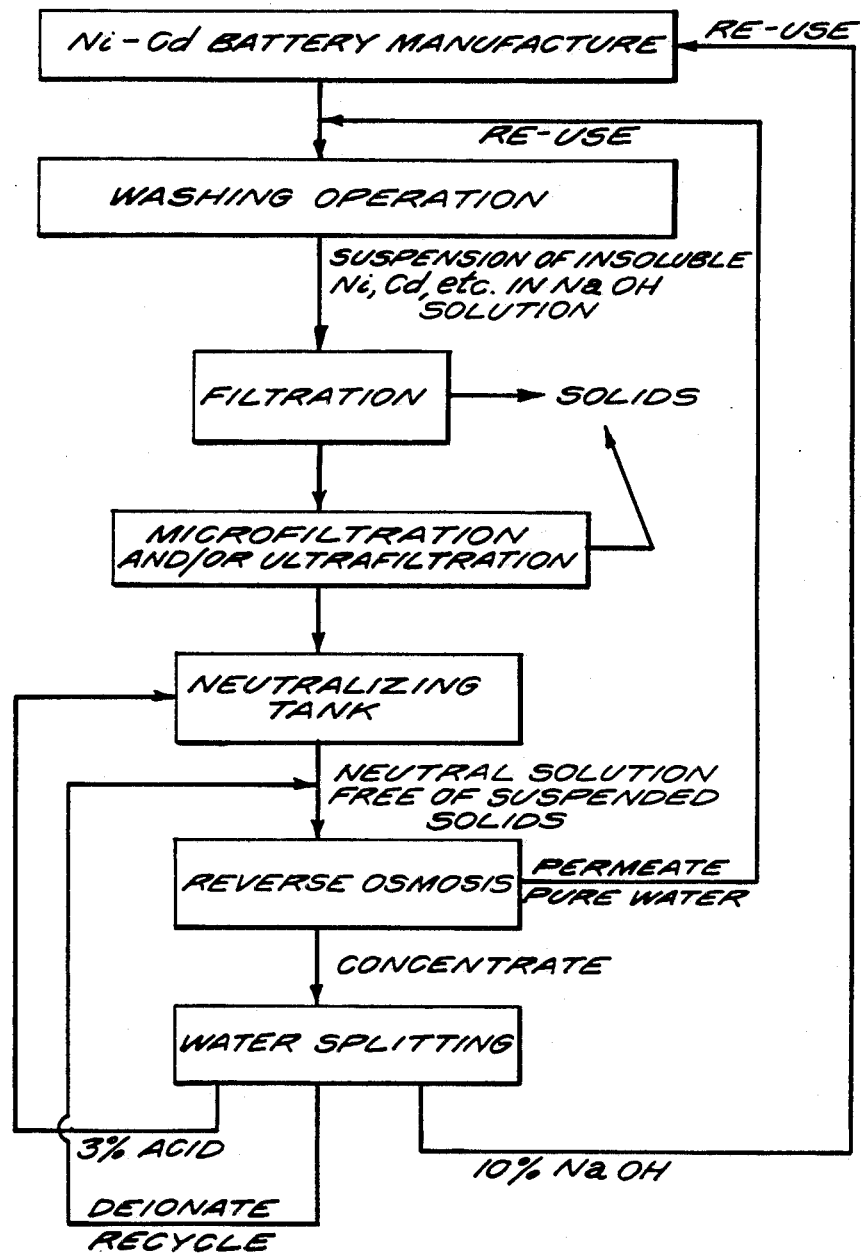
FIGS. 5 and 5A are schematic flow sheets of processes for treating waste water from the production of nickel-cadmium batteries.

FIG. 5 shows an embodiment for the treatment of the waste stream from the manufacture of nickel-cadmium batteries, one which is highly alkaline and contains nickel and cadmium along with traces of other toxic metals as insoluble hydroxides, carbonates or other insoluble basic salts. The process involves filtration (combined with microfiltration and/or ultrafiltration to remove suspended solids where desirable), followed by neutralization with acid produced by water splitting to provide a neutral feed for concentration by RO, with the RO permeate recycled as rinse water. The RO concentrate goes to the water-splitting cell which produces acid concentrated for neutralization and reuse, sodium hydroxide concentrated for reuse in the battery-forming operation, with the deionate recycled to the feed to the RO process.

Figure 5A:
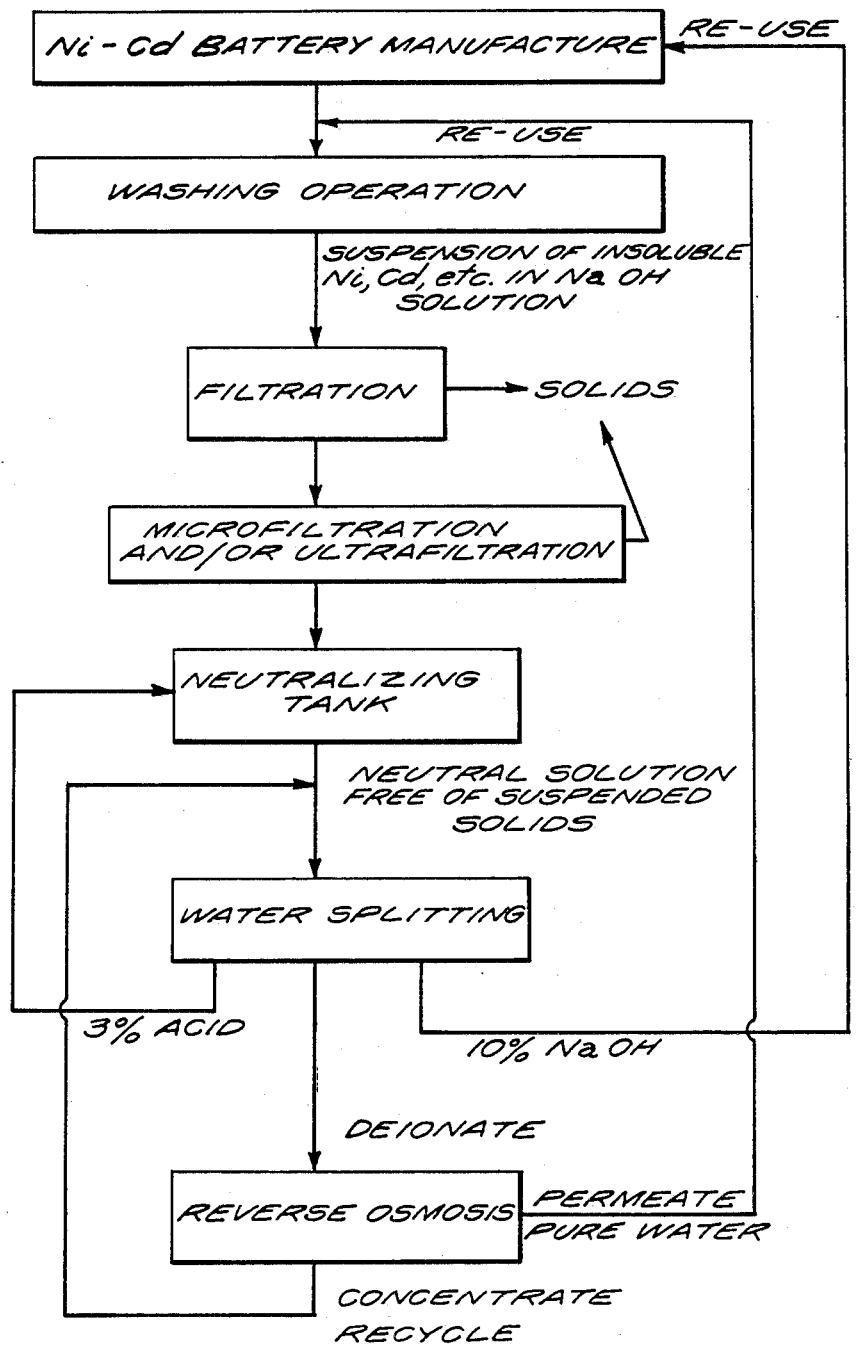

In FIG. 5A, the water splitting precedes the RO but the process is otherwise essentially the same as in FIG. 5.

The invention will be further described in the following illustrative example wherein all parts are by weight unless otherwise expressed.

EXAMPLE

By the process illustrated in FIG. 1, there is treated an effluent from the rinsing step in a lead-acid battery manufacturing operation. The effluent is supplied at the rate of 50 gallons per minute and is 0.04N in sulfuric acid, containing 400 mg/l of Pb. This passes into a neutralizing tank where a slurry of magnesium hydroxide sufficient to raise the ph to 8 is added. The heavy suspended solids are removed by a press filter; and the residual, finely divided suspended solids are removed by microfiltration and/or ultrafiltration to provide the necessary pretreatment for RO, with the solids being recirculated to the filter press and an effluent of approximately 0.035N magnesium sulfate with small amounts of sodium sulfate being the product. RO produces 0.3N magnesium sulfate solution plus small amounts of water with the (permeate) water of high purity containing less than 100 mg/l of dissolved solids being returned for rinse water reuse. The RO concentrate then passes into the feed compartment of the water-splitting cell where it emerges as a deionate which is then recycled back to the feed of the RO plant for reconcentration. The acid product is approximately 3–5% sulfuric acid which is returned to battery manufacture. The base stream originally is approximately 0.1N in sodium sulfate and is kept at that level through recycle. The base product stream consisting of magnesium hydroxide precipitate, sodium hydroxide and sodium sulfate is then treated to settle out the magnesium hydroxide concentrate as a high-solids slurry which is then sent to the neutralizing tank. The remainder is recycled to the base compartment.

It is understood that the specification and examples are illustrative but not limitative of the present invention and that other embodiments within the spirit and scope of the invention will suggest themselves to those skilled in the art.

We claim:

1. A closed process for the treatment of an aqueous effluent stream produced in the manufacture of lead storage batteries which effluent stream contains at least one of an acid and a base, said process, in which all streams produced therein are recycled, comprising:
   (a) treating the effluent stream by reverse osmosis, thereby producing a relatively pure water stream and a concentrate stream;
   (b) treating the concentrate stream by water splitting, thereby producing acid, base, and deionate streams;
   (c) recycling at least a portion of the pure water stream and the acid stream to the process from which the effluent stream evolved;
   (d) recycling the base stream to at least one of the processes from which the effluent stream evolved, and the water splitting step (b); and
   (e) recycling the deionate stream directly to the reverse osmosis step (a).

2. The process of claim 1 wherein the reverse osmosis step (a) is reversed with the water splitting step (b), said aqueous stream being treated by water splitting, said deionate stream being recycled directly to the reverse osmosis, and said concentrate stream being recycled into the water splitting step.

3. A closed process for the treatment of an aqueous effluent stream produced in the manufacture of lead storage batteries which effluent stream contains a precipitatable material and at least one of an acid and a base, said process, in which all streams produced therein are recycled, comprising:
   (a) treating the effluent stream to selectively precipitate and remove the precipitatable material without precipitating significant quantities of the acid or base, thereby producing an aqueous stream;
   (b) treating the aqueous stream with reverse osmosis, thereby producing a relatively pure water stream and a concentrate stream;
   (c) treating the concentrate stream by water splitting, thereby producing acid, base, and deionate streams;
   (d) recycling the deionate stream directly to the reverse osmosis step (b); and
   (e) selectively recycling the water, acid, and base streams to at least one of said closed aqueous effluent stream treatment process and the process from which the effluent evolved,
whereby most of the precipitatable material is extracted from the effluent in a relatively concentrated solid form.

4. The process of claim 3 wherein the reverse osmosis step (b) is reversed with the water splitting step (c), said aqueous stream being treated by water splitting, said deionate stream being recycled directly to the reverse osmosis step, and said concentrate stream being recycled to the water splitting step.

5. A closed process for treating an aqueous effluent stream which contains a precipitatable material and at least one of an acid and a base, said process, in which all streams produced therein are recycled, comprising:
   (a) precipitating with a precipitating base the precipitatable material in such quantities that a significant amount of the acid is not precipitated;
   (b) removing the precipitated, precipitatable material, thereby producing an aqueous stream;
   (c) treating the aqueous stream by reverse osmosis, thereby producing a relatively pure water stream and a concentrated aqueous stream;
   (d) recycling the relatively pure water stream into the process from which the effluent evolved;
   (e) treating the concentrated aqueous stream by water splitting wherein a neutral salt is added to the base stream produced therein, thereby producing acid, base, and deionate streams, said base stream containing the precipitating base of step (a) and the neutral salt;
   (f) recycling the acid stream to the process from which the effluent stream evolved;
   (g) separating the precipitating base from the base stream, thereby producing a base stream containing the neutral salt;
   (h) recycling the base stream to the water splitting step (e);
   (i) recycling the precipitating base to the precipitating step (a); and
   (j) recycling the deionate stream directly to the reverse osmosis step (c),
whereby most of the precipitatable material is extracted from the effluent in a relatively concentrated solid form.

6. The process of claim 5 wherein the reverse osmosis step (c) is reversed with the water splitting step (e), said aqueous stream being treated by water splitting, said deionate stream being recycled directly to the reverse osmosis step, and said concentrate stream being recycled to the water splitting step.

7. The process of claims 5 or 6, wherein the effluent stream evolves from washing operations of head storage battery manufacturing; and wherein:
   (a) the precipitatable material comprises $PbSO_4$;
   (b) the acid comprises $H_2SO_4$;
   (c) the precipitating base comprises $Mg(OH)_2$;
   (d) the neutral salt comprises $Na_2SO_4$.

8. The process of claim 5 or 6 for treating rinse water streams from acid/copper plating, wherein the rinse water streams comprise $H_2SO_4$ and $CuSO_4$, and wherein the precipitating base comprises $Mg(OH)_2$ and the neutral base comprises $Na_2SO_4$.

9. A closed process for treating spent pickling streams and rinse water streams from iron pickling wherein said spent pickling strams comprise $FeCl_2$, $HCl$, and $NaCl$, and the rinse water stream comprises $FeCl_2$ and $HCl$, said process, in which all streams produced therein are recycled, comprising:
   (a) treating the spent pickling stream with water splitting, thereby producing acid, base, and deionate streams, wherein the base stream comprises $NaOH$, $NaCl$, and precipitated $Fe(OH)_2$;
   (b) concentrating the acid stream by electrodialysis, thereby producing a concentrated acid stream and an electrodialysis deionate stream;
   (c) recycling the concentrated acid stream to the iron pickling process;
   (d) filtering the $Fe(OH)_2$ from the base stream;
   (e) recycling part of the filtered base stream to the water splitting step (a);
   (f) neutralizing the rinse water stream with part of the filtered base stream, thereby precipitating $Fe(OH)_2$;

(g) recycling the electrodialysis deionate and the deionate streams to the neutralization step (f);

(h) filtering the Fe(OH)$_2$, thereby producing an aqueous stream;

(i) treating the aqueous stream with reverse osmosis, thereby producing a relatively pure water stream and a concentrate stream;

(j) recycling the relatively pure water stream to the iron pickling process; and (k) treating the concentrate stream in the water splitting step (a).

10. A closed process for treating a filtered effluent stream from nickel-cadmium battery manufacture, in which all streams produced therein are recycled, wherein the effluent contains NaOH, comprising:

(a) neutralizing the effluent stream with the acid stream described in step (d) below, thereby producing a neutralized stream;

(b) treating the neutralized stream with reverse osmosis, thereby producing a relatively pure water stream and a concentrate stream;

(c) recycling the pure water stream to the battery manufacture process;

(d) treating the concentrate stream with water splitting, thereby producing acid, base, and deionate streams;

(e) recycling the acid stream to the neutralization step (a);

(f) recycling the base stream which comprises NaOH to the battery manufacture process; and (g) recycling the deionate stream directly to the reverse osmosis step (b).

11. The process of claim 10 wherein the reverse osmosis step (b) and the water splitting step (d) are reversed, and wherein the concentrate stream is recycled into the water splitting step, and the deionate stream is introduced into the reverse osmosis step.

12. A closed process for the treatment of an aqueous effluent stream produced in a metal-treating process which effluent stream contains at least one of an acid and a base, said process, in which all streams produced therein are recycled, comprising:

(a) treating the effluent stream by reverse osmosis, thereby producing a relatively pure water stream and a concentrate stream;

(b) treating the concentrate stream by water splitting, thereby producing acid, base, and deionate streams;

(c) recycling at least a portion of the pure water stream and the acid stream to the process from which the effluent stream evolved;

(d) recycling the base stream to at least one of the processes from which the effluent stream evolved, and the water splitting step (b); and (e) recycling the deionate stream directly to the reverse osmosis step (a).

13. The process of claim 12 wherein the reverse osmosis step (a) is reversed with the water splitting step (b), said aqueous stream being treated by water splitting, said deionate stream being recycled directly to the water splitting step.

14. A closed process for the treatment of an aqueous effluent stream produced in a metal treating process which effluent stream contains a precipitatable material and at least one of an acid and a base, said process, in which all streams produced therein are recycled, comprising:

(a) treating the effluent stream to selectively precipitate and remove the precipitatable material without precipitating significant quantities of the acid or base, thereby producing an aqueous stream;

(b) treating the aqueous stream with reverse osmosis, thereby producing a relatively pure water stream and a concentrate stream;

(c) treating the concentrate stream by water splitting thereby producing acid, base, and deionate streams;

(d) recycling the deionate stream directly to the reverse osmosis step (b); and (e) selectively recycling the water, acid, and base streams to at least one of said closed aqueous effluent stream treatment process and the process from which the effluent evolved, whereby most of the precipitatable material is extracted from the effluent in a relatively concentrated solid form.

15. The process of claim 14 wherein the reverse osmosis step (b) is reversed with the water splitting step (c), said aqueous stream being treated by water splitting, said deionate stream being recycled directly to the reverse osmosis step, and said concentrate stream being recycled to the water splitting step.

16. A closed process for the treatment of an aqueous effluent stream which effluent stream contains at least one of an acid and a base, said process, in which all streams produced therein are recycled, comprising:

(a) treating the effluent stream by reverse osmosis, thereby producing a relatively pure water stream and a concentrate stream;

(b) treating the concentrate stream by water splitting, thereby producing acid, base, and deionate streams;

(c) recycling at least a portion of the pure water stream and the acid stream to the process from which the effluent stream evolved;

(d) recycling the base stream to at least one of the processes from which the effluent stream evolved, and the water splitting step (b); and (e) recycling the deionate stream directly to the reverse osmosis step (a).

17. The process of claim 16 wherein the reverse osmosis step (a) is reversed with the water splitting step (b), said aqueous stream being treated by water splitting, said deionate stream being recycled directly to the water splitting step.

18. A closed process for the treatment of an aqueous effluent stream which effluent stream contains a precipitatable material and at least one of an acid and a base, said process, in which all streams produced therein are recycled, comprising:

(a) treating the effluent stream to selectively precipitate and remove the precipitatable material without precipitating significant quantities of the acid or base, thereby producing an aqueous stream;

(b) treating the aqueous stream with reverse osmosis, thereby producing a relatively pure water stream and a concentrate stream;

(c) treating the concentrate stream by water splitting, thereby producing acid, base, and deionate streams;

(d) recycling the deionate stream directly to the reverse osmosis step (b); and (e) selectively recycling the water, acid, and base streams to at least one of said closed aqueous effluent stream treatment process and the process from which the effluent evolved, whereby most of the precipitatable material is extracted from the effluent in a relatively concentrated solid form.

19. The process of claim 18 wherein the reverse osmosis step (b) is reversed with the water splitting step (c), said aqueous stream being treated by water splitting, said deionate stream being recycled directly to the reverse osmosis step, and said concentrate stream being recycled to the water splitting step.

* * * * *